United States Patent [19]

Tokura et al.

[11] Patent Number: 5,779,394

[45] Date of Patent: Jul. 14, 1998

[54] QUAY SIDE DEVICE FOR ENGAGING A CHAIN FOR A MARINE FENDER

[75] Inventors: Takuma Tokura, Kawasaki; Hitoshi Akiyama, Fujisawa, both of Japan

[73] Assignee: Bridgestone Corporation, Tokyo, Japan

[21] Appl. No.: 654,344

[22] Filed: May 28, 1996

[51] Int. Cl.$^6$ .................................................. E02B 3/22
[52] U.S. Cl. .......................... 405/212; 114/219; 405/211
[58] Field of Search .............................. 405/211–215; 114/219, 218; 52/295

[56] References Cited

U.S. PATENT DOCUMENTS

| 899,185 | 9/1908 | Purdy | 52/295 X |
|---|---|---|---|
| 2,652,694 | 9/1953 | Melges | 405/213 X |
| 2,879,985 | 3/1959 | Waddell et al. | 405/215 X |
| 3,798,916 | 3/1974 | Schwemmer | 405/215 |
| 3,998,026 | 12/1976 | Allen | 52/295 X |
| 4,329,826 | 5/1982 | Flogaus et al. | 52/295 X |
| 4,788,927 | 12/1988 | Casey | 114/218 X |
| 4,848,969 | 7/1989 | Murota et al. | 405/212 X |

Primary Examiner—Dennis L. Taylor
Attorney, Agent, or Firm—Sughrue, Mion, Zinn, Macpeak & Seas, PLLC

[57] ABSTRACT

A quay side device for engaging a chain for a marine fender attached to a fitting face of a quaywall or another berthing installation comprises a pair of rigid plates separated in parallel to each other, a round hole formed in a protruding portion of the rigid plate from the quaywall, a support rod detachably inserted into the round holes between the protruding portions of the rigid plates, and a fixing member arranged in end portions of the rigid plates embedded in the quaywall.

2 Claims, 4 Drawing Sheets

QUAY SIDE DEVICE FOR ENGAGING A CHAIN FOR A MARINE FENDER

BACKGROUND OF THE INVENTION

1. Field of the Invention

This invention relates to a quay side device for engaging a chain used for restraining a deformation of a marine fender, and more particularly to a device for connecting a cell type marine fender or a hydraulic marine fender to a quaywall through a chain to prevent the deformation of such a marine fender.

2. Description of Related Art

When a chain in a chain line connected to a shock receiving portion of a marine fender is fixed to a quaywall, as shown in FIG. 1, a quay side device for engaging the chain of the marine fender is used by embedding a U-shaped anchor 1 of a round steel provided at each of both end portions with a stopper 2 in a quaywall 3 in the vicinity of an upper end thereof. In this case, however, this anchor 1 is required to have a larger sectional area or diameter in order to prevent the pulling-out of the anchor from the quaywall and increase the strength for supporting the dead weight of the marine fender to prevent the falling-down of the marine fender.

Since the round steel bar is used as the anchor, when it is rendered into U-shape, as the sectional area or diameter of the round steel becomes larger, the bending radius should be made large. As a result, when such a U-shaped anchor is embedded in the quaywall, a protruding portion of the anchor from the quaywall is very large in the length and width, so that the external appearance is poor.

When a chain 4 in the chain line connected to the marine fender is connected to the U-shaped anchor 1 through a shackle 5 as shown in FIG. 2, the diameter of the shackle 5 is made large accompanied with the large sizing of the diameter of the U-shaped anchor 1, which becomes larger than a connecting space of the chain 4, so that the shackle 5 can not directly be connected to the chain 4. As a result, the chain 4 should be connected to the shackle 5 through an end link 6 as shown in FIG. 2. For this end, there are faults in the fitting operation of the chain. Particularly, the cutting of the chain, refixing of the end link and the like take a long time and is troublesome labor for adjusting the length of the chain line.

SUMMARY OF THE INVENTION

It is, therefore, an object of the invention to solve the aforementioned problems of the conventional technique and to provide a quay side device for engaging a free end of a chain in a chain line connected to a marine fender without a shackle and an end link in which the chain is directly engageable with a support pin to improve the fitting operation of the chain to thereby easily and rapidly conduct the detachment of the chain and the adjustment of the chain line length and a protruding portion of the device from the quaywall is made as small as possible to improve the external appearance.

According to the invention, there is the provision of a quay side device for engaging a chain for a marine fender attached to a fitting face of a quaywall or another berthing installation, comprising a pair of rigid plates separated in parallel to each other and mostly embedded in the quaywall, a round hole formed in a protruding portion of each rigid plate from the fitting face of the quaywall, a support rod detachably inserted into the round holes between the protruding portions of the rigid plates, and a fixing member arranged in end portions of the rigid plates embedded in the quaywall.

In a preferable embodiment of the invention, the fixing member comprises a round hole formed in the embedded end portion of each rigid plate and a fixing rod inserted into the holes between the embedded end portions.

In another preferable embodiment of the invention, the fixing member comprises a round hole formed in the embedded end portion of each rigid plate, a fixing rod inserted into the holes between the embedded end portions, a fixing plate provided at its one end portion with a round hole passing the fixing rod and slantly extending downward with respect to a longitudinal direction of the rigid plate.

In the other preferable embodiment of the invention, the fixing member comprises a fixing plate attached to the ends of the embedded end portions of the rigid plates and slantly extending downward with respect to a longitudinal direction of the rigid plate.

BRIEF DESCRIPTION OF THE DRAWINGS

The invention will be described with reference to the accompanying drawings, wherein.

DESCRIPTION OF PREFERRED EMBODIMENTS

According to the invention, a pair of rigid plates separated and in parallel to each other are mostly embedded in the quaywall and the support rod is detachably inserted into the round holes formed in protruding portions of the rigid plates from the quaywall, so that it is not required to use a material having an unnecessarily large diameter as in the conventional U-shaped anchor in the engaging portion of the device and hence the diameter of the support rod may be selected in accordance with the size of the chain used. That is, the chain can directly be engaged with the support rod and also the detachment of the chain is easy because the support rod is easily removed from the round holes formed in the protruding portions. Therefore, the adjustment of the chain line length is easily carried out by cutting only an unnecessary link(s) from the chain line without using the end link and the shackle. Furthermore, the protruding length and width of the device exposed from the quaywall may be minimized because there is no curved portion as in the U-shaped anchor.

On the other hand, the fixing member is arranged on the end portions of the rigid plates embedded in the quaywall.

Particularly, when the fixing plate attached to the ends of the embedded rigid plates is used as the fixing member, the embedding depth of the device can be made more deeper and also the pulling strength of the device from the quaywall can be more increased.

Figure 1:
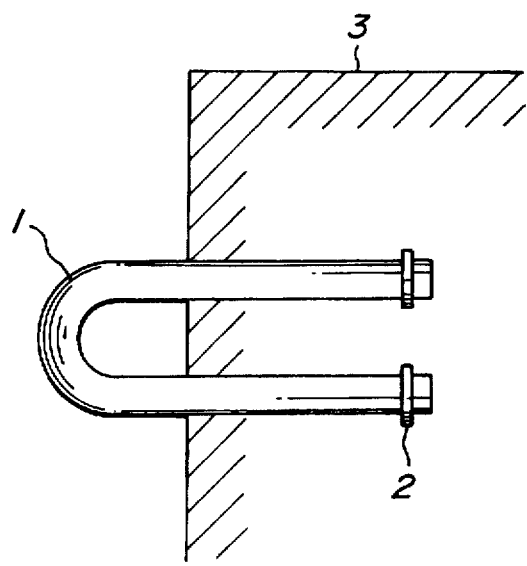
FIG. 1 is a side view of the conventional U-shaped anchor at a state that a greater part of the anchor is embedded in a quaywall.
Figure 2:
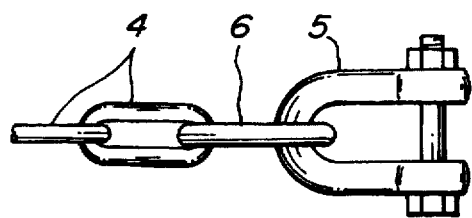
FIG. 2 is a schematic view of a combination of shackle-end link-chains for connecting to the conventional U-shaped anchor.
Figure 3:
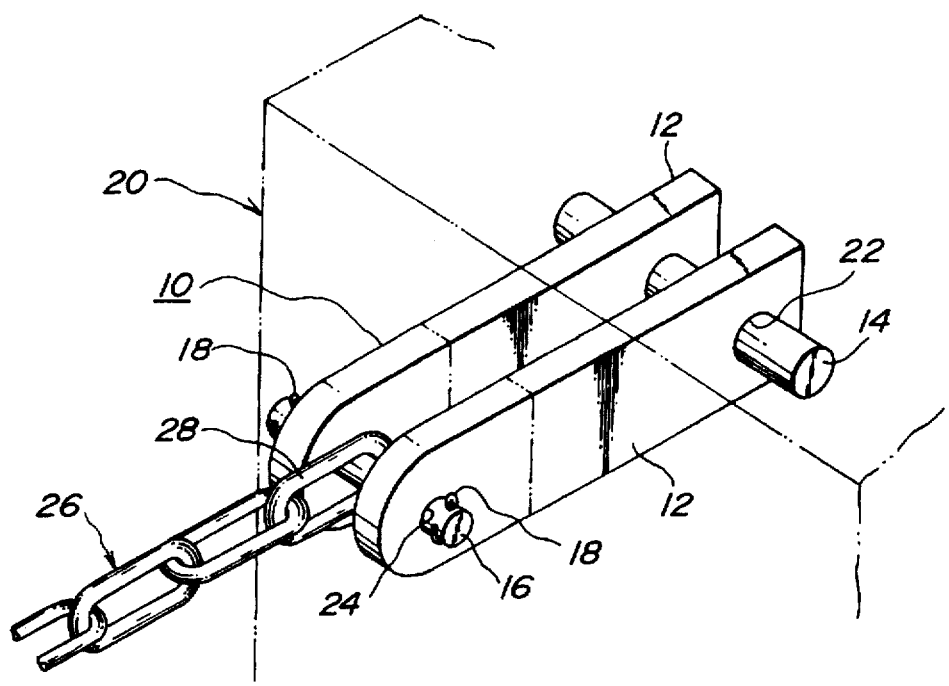
FIG. 3 is a perspective view of a first embodiment of the quay side device according to the invention.

In FIG. 3 is perspectively shown a first embodiment of the quay side device for engaging a chain for a marine fender according to the invention. This device 10 comprises a pair of rigid plates 12 separated in parallel to each other, a fixing rod 14, a support rod 16 and a split pin 18. That is, the rigid plates 12 are arranged at a distance of 70 mm separated in parallel to each other, and each of these plates has an overall length of 860 mm in which a portion of the plate embedded in a quay wall 20 (shown by a phantom line) has a length of 700 mm and a portion of the plate protruding from a fitting face of the quaywall 20 has a length of 160 mm. A round hole 22 having a diameter of 70 mm is formed in the vicinity of an end of the rigid plate 12 embedded in the quaywall, while the fixing rod 14 having an overall length of 350 mm is inserted into the round holes 22 of the rigid plates 12 and fixed to the rigid plates by the welding around the holes to serve as a stopper for preventing the pulling-out of the device 10 from the quaywall 20. On the other hand, a round hole 24 having a diameter of 58 mm is formed in the vicinity of an end of the rigid plate 12 protruding from the quaywall 20, while the support rod 16 having an overall length of 180 mm is detachably inserted into the round holes 24. Moreover, a pair of through-holes are formed in both end portions of the support rod 16 and a pair of split pins 18 are inserted into the respective through-holes to prevent pulling-out of the support rod 16 from the rigid plates 12.

As shown in FIG. 3, a chain 28 in a chain line 26 connected to a marine fender (not shown) is directly engaged with the support rod 16 by inserting the support rod 16 into a connecting space of the chain link 28 during the insertion into the round holes 24. If the size of the connecting space in the chain 28 to be used is different from the diameter of the support rod 16, another round hole having a diameter corresponding to such a size of the connecting space may be formed near to the round hole 24 and another support rod having the same diameter as the round hole may be inserted into this round hole.

Figure 4:
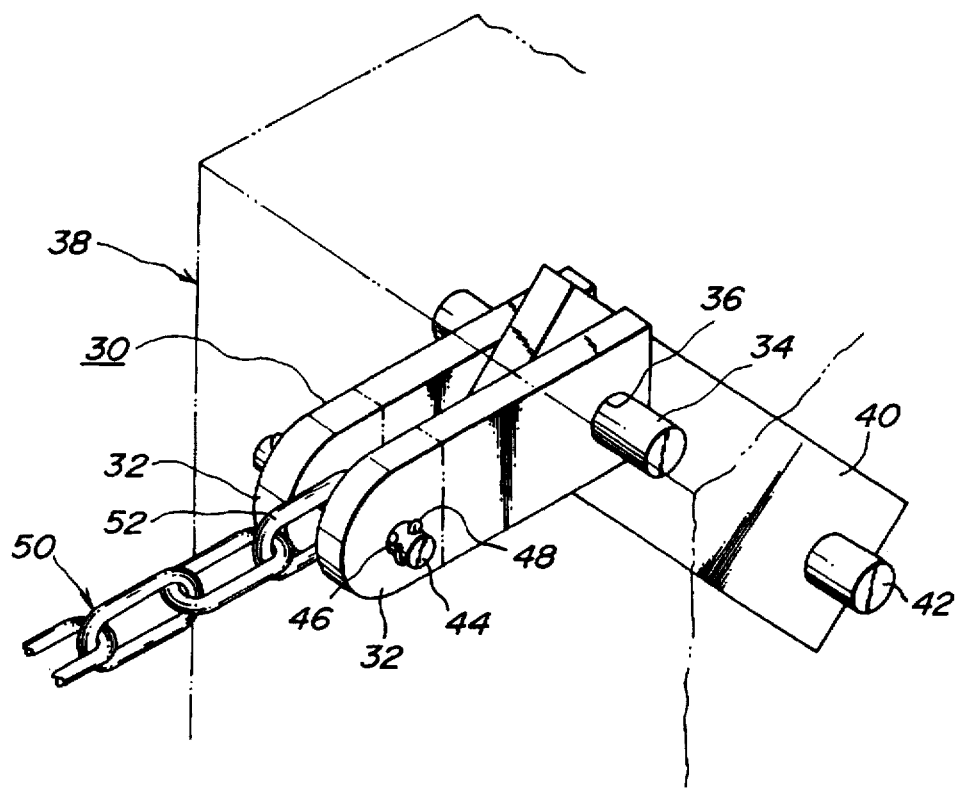
FIG. 4 is a perspective view of a second embodiment of the quay side device according to the invention.

FIG. 4 perspectively illustrate a second embodiment of the quay side device for engaging a chain for a marine fender according to the invention. This device 30 comprises a pair of rigid plates 32 separated in parallel to each other, a fixing rod 34 passing through a round hole 36 formed in an end portion of the rigid plate embedded in a quaywall 38 (shown by a phantom line), a fixing plate 40 provided at both end portions with a pair of through-holes passing the fixing rod 34 and an anchor rod 42, a support rod 44 passing through a round hole 46 formed in an end portion of the rigid plate 32 protruding from a fitting face of the quaywall 38, and a split pin 48 inserted into a through-hole formed in each end portion of the support rod 44.

As shown in FIG. 4, a pair of the rigid plates 32 having an overall length of 500 mm are arranged at a distance separated and in parallel to each other, in which a portion of the rigid plate embedded in the quaywall 38 has a length of 340 mm and a portion of the rigid plate protruding from the quaywall has a length of 160 mm.

A chain link 52 in a chain line 50 connected to a marine fender (not shown) is directly engaged with the support rod 44 having an overall length of 180 mm by inserting the support rod 44 into a connecting space of the chain 52 during the insertion into the round holes 46 having a diameter of 58 mm. Thereafter, the split pin 48 is inserted into the through-hole of the support rod 44 to prevent the pulling-out of the support rod 44 from the round holes 46 of the rigid plates 32.

On the other hand, the fixing plate 40 having an overall length of 400 mm is disposed between the rigid plates 32 and the fixing rod 34 is passed through the round holes 36 of the rigid plates 32 and the through-hole of the fixing plate 40, each of which holes having a diameter of 70 mm. In this case, the fixing plate 40 is extended downward at an inclination angle of 45° with respect to a longitudinal direction of the rigid plate 32 and is fixed to the rigid plates 32 by welding, while the fixing rod is fixed to the rigid plates 32 by welding. Furthermore, the anchor rod 42 having a diameter of 70 mm is inserted into the through-hole formed in the other end portion of the fixing plate 40 and fixed to the fixing plate 40 by welding. Thus, the pulling-out of the device 30 from the quaywall 38 is positively prevented by the fixing rod 34, the fixing plate 40 and the anchor rod 42.

Figure 5:
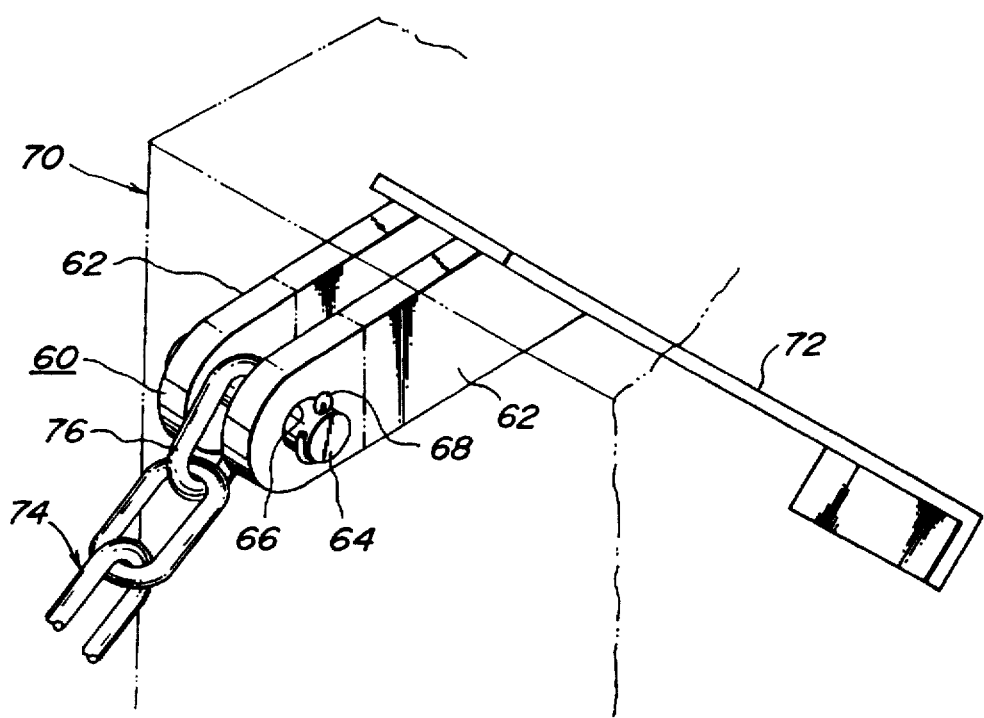
FIG. 5 is a perspective view of a third embodiment of the quay side device according to the invention.

In FIG. 5 is perspectively shown a third embodiment of the quay side device for engaging a chain for a marine fender according to the invention. This device 60 comprises a pair of rigid plates 62 separated in parallel to each other, a support rod 64 passing through a round hole 66 formed in an end portion of each of the rigid plates 62 protruding from a fitting face of a quaywall 70 (shown by a phantom line), a split pin 68 passing through a through-hole formed in the support rod 64, and a fixing plate 72 fixed to slantly cut ends of the rigid plates 62 embedded in the quaywall 70 and extending downward at an inclination angle of 45° with respect to a longitudinal direction of the rigid plate. That is, the third embodiment is a modification of the second embodiment in which the fixing plate 72 is directly fixed to the slantly cut ends of the rigid plates 62 by welding and the other end portion of the fixing plate 72 is folded into L-shape to serve as an anchor portion. Thus, the number of parts used can be further reduced. Moreover, a chain 76 in a chain line 74 connected to a marine fender (not shown) is directly supported by the support rod 64 likewise the first and second embodiments.

As mentioned above, according to the invention, the chain in the chain line connected to the marine fender can directly be engaged with the support rod in the quay side device, so that the detachment of the chain and the adjustment of the chain line length can easily and rapidly be carried out without using the end link and shackle. Furthermore, the portion of the rigid plate protruding from the fitting face of the quaywall can be made as small as possible to improve the external appearance and also sufficient pulling strength can be ensured even if the device is located in an upper end portion of the quaywall.

However, there is a case that the length of the chain line connected to the marine fender is too short with respect to the position of the quay side device disposed in the quaywall. For this end, the chain line connected to the marine fender is usually connected to a chain line connected to the quay side device through a turnbuckle or a shackle to adjust the total chain line length. In this case, the adjustment of the length is carried out only within a threaded region of the turnbuckle or shackle, but the length adjustment becomes impossible due to the occurrence of rust corrosion in the threading portion of the turnbuckle or shackle.

Figure 6:
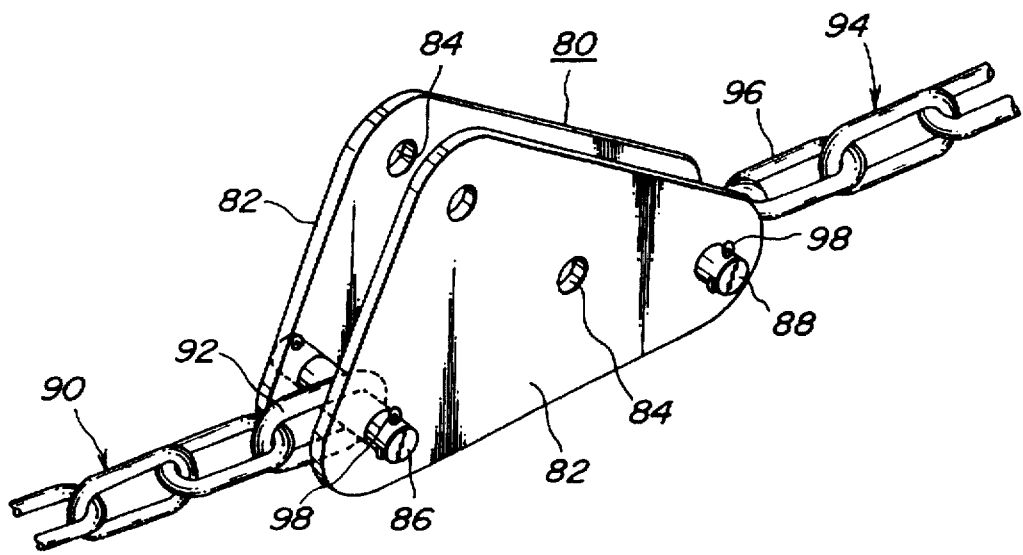
FIG. 6 is a perspective view of an embodiment of the apparatus for adjusting a length of a chain line to be used in the invention.

According to the invention, therefore, an apparatus 80 shown in FIG. 6 is preferably used as an apparatus for adjusting a length of a chain line between the marine fender and the quay side device. This apparatus 80 comprises a pair of rigid plates 82 separated in parallel to each other, four sets of round holes 84 formed at given positions in these rigid plates 82, and two support rods 86, 88 each supporting a chain (92, 96) in a chain line (90, 94) and passing through proper two round holes among the four round holes 84. Further, each of the support rods 86, 88 is provided at both end portions with through-holes and a split pin 98 is inserted into the through-hole to prevent the pulling-out of the support rod from the round hole.

As a material of the rigid plate, use may be made of steel, light alloy, reinforced plastic and the like. The distance between the rigid plates is preferable to be larger than a minor axis of the chain. The number of the round holes formed in the rigid plate is at least three in accordance with the total length of the chain line to be adjusted. The adjustment of the total chain line length may be carried out by properly selecting positions of two round holes from three or more round holes formed in the rigid plate to be inserted by the two support rods. Moreover, a nut may be used in the support rod instead of the split pin for prevention of the pulling-out.

Figure 7:
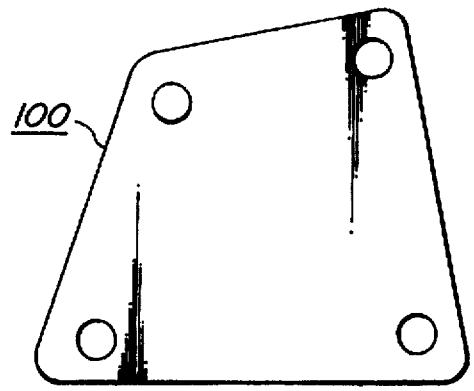
FIGS. 7 and 8 are side views of various embodiments of the rigid plate used in the chain length adjusting apparatus.
Figure 8:
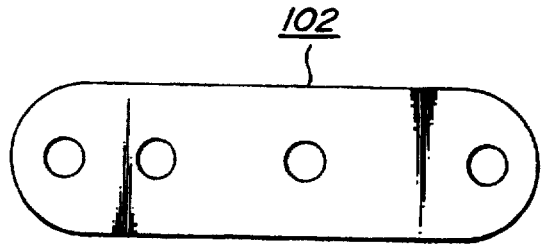

Further, a trapezoidal rigid plate 100 shown in FIG. 7, a rectangular rigid plate 102 shown in FIG. 8 and the like may be used instead of the rigid plate shown in FIG. 7. In any case, the rigid plate is subjected to chamfering in order to ensure the safeness in the fitting operation of the chain. Moreover, when the chain length adjusting apparatus is used under a condition exposed to damage from salt water, it is preferable to be subjected to zinc plating or the like for use over a long time.

What is claimed is:

1. A quay side device for engaging a chain for a marine fender attached to a fitting face of a quaywall or another berthing installation, comprising: a pair of rigid plates separated and in parallel to each other and mostly embedded in the quaywall, a round hole formed in a protruding portion of each rigid plate from the fitting face of the quaywall, a support rod detachably inserted into the round holes between the protruding portions of the rigid plates, and a fixing member arranged in end portions of the rigid plates embedded in the quaywall, wherein said fixing member comprises a round hold formed in the embedded end portion of each rigid plate, a fixing rod inserted into the holes between the embedded end portions, a fixing plate provided at its one end portion with a round hole passing the fixing rod and slantly extending downward with respect to a longitudinal direction of the rigid plate.

2. A quay side device for engaging a chain for a marine fender attached to a fitting face of a quaywall or another berthing installation, comprising: a pair of rigid plates separated and in parallel to each other and mostly embedded in the quaywall, a round hole formed in a protruding portion of each rigid plate from the fitting face of the quaywall, a support rod detachably inserted into the round holes between the protruding portions of the rigid plates, and a fixing member arranged in end portions of the rigid plates embedded in the quaywall, wherein said fixing member comprises a fixing plate attached to the ends of the embedded end portions of the rigid plates and slantly extending downward with respect to a longitudinal direction of the rigid plate.

* * * * *